US011295175B1

(12) United States Patent
Adeniran et al.

(10) Patent No.: US 11,295,175 B1
(45) Date of Patent: Apr. 5, 2022

(54) AUTOMATIC DOCUMENT SEPARATION

(71) Applicant: International Business Machines Corporation, Armonk, NY (US)

(72) Inventors: Abisola Adeniran, Halifax (CA); Aisha Aliyu, Halifax (CA); Qingxue Xu, Bedford (CA)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 17/032,046

(22) Filed: Sep. 25, 2020

(51) Int. Cl.
*G06K 9/00* (2022.01)
*G06K 9/62* (2022.01)
(Continued)

(52) U.S. Cl.
CPC ......... *G06K 9/6264* (2013.01); *G06K 9/6215* (2013.01); *G06K 9/6218* (2013.01);
(Continued)

(58) Field of Classification Search
CPC ........ G06K 9/202; G06K 9/2011; G06K 9/20; G06K 9/342; G06K 9/34; G06K 9/346;
(Continued)

(56) References Cited

U.S. PATENT DOCUMENTS 7,013,309 B2    3/2006  Chakraborty et al.
7,249,046 B1 *  7/2007  Katsurabayashi ........................... G06Q 10/063112
                                                                        705/7.14

(Continued)

FOREIGN PATENT DOCUMENTS

JP    2002312385 A    10/2002
WO    2017174778 A1   10/2017

OTHER PUBLICATIONS

Agin et al., "An Approach to the Segmentation of Multi-page Document Flow Using Binary Classification", Proceedings of SPIE—The International Society for Optical Engineering 9443, Mar. 2015, 8 pages, <2. https://www.researchgate.net/publication/274638619_An_approach_to_the_segmentation_of_multi-page_document_flow_using_binary_classifi cation>.

(Continued)

*Primary Examiner* — Amir Alavi
(74) *Attorney, Agent, or Firm* — Sonny Z. Zhan (57) ABSTRACT

In an approach for an automatic document separation, a processor extracts one or more features from a document containing a plurality of pages. A processor generates a data frame based on the feature extraction. In response to analyzing a similarity between the plurality of pages, a processor determines whether the similarity exceeds a predetermined threshold. In response to determining that the similarity does not exceed the predetermined threshold, a processor transforms text into vectors forming float arrays. In response to benchmarking a set of predetermined clustering algorithms, a processor identifies a clustering algorithm using a predetermined criterion. A processor clusters the plurality of pages, using the clustering algorithm, to create a group of pages. A processor validates the clustered group of pages. In response to passing validation, a processor generates a set of final separated files based on the clustered group of pages.

20 Claims, 6 Drawing Sheets

(51) Int. Cl.
*G06V 30/414* (2022.01)
*G06V 30/418* (2022.01)
*G06V 30/10* (2022.01)

(52) U.S. Cl.
CPC ......... *G06K 9/6227* (2013.01); *G06V 30/414* (2022.01); *G06V 30/418* (2022.01); *G06V 30/10* (2022.01)

(58) Field of Classification Search
CPC ...... G06K 9/344; G06K 9/348; G06K 9/4609; G06K 9/6264; G06K 9/6227; G06F 17/243; G06F 17/30257; G06F 17/3024; G06F 17/3072; G06T 7/0083; G06T 2207/10016; G11B 27/28; H04N 1/38; H04N 1/40062
See application file for complete search history.

(56) References Cited

U.S. PATENT DOCUMENTS

| | | | | |
|---|---|---|---|---|
| 7,626,111 B2 * | 12/2009 | Kim | ......................... | G10H 1/00 84/600 |
| 8,090,743 B2 * | 1/2012 | Cha | ......................... | G06F 16/35 707/779 |
| 8,145,586 B2 * | 3/2012 | Choi | ........................ | G06K 9/00 706/46 |
| 8,194,933 B2 * | 6/2012 | Lei | ........................ | G06K 9/6247 382/112 |
| 8,494,273 B2 * | 7/2013 | Chevion | .............. | G06K 9/6255 382/182 |
| 8,819,024 B1 * | 8/2014 | Toderici | .................. | G06F 16/36 707/740 |
| 8,897,563 B1 * | 11/2014 | Welling | ................... | G06K 9/48 382/173 |
| 8,930,288 B2 * | 1/2015 | Toderici | ............... | G06K 9/6292 706/12 |
| 9,233,399 B2 | 1/2016 | Moore et al. | | |
| 9,852,344 B2 * | 12/2017 | Dunlop | .............. | G06K 9/00718 |
| 9,910,829 B2 | 3/2018 | Schmidtler et al. | | |

OTHER PUBLICATIONS

Collins-Thompson et al., "A Clustering-Based Algorithm for Automatic Document Separation", Sep. 21, 2002, 5 pages, <https://www.researchgate.net/publication/2543759_A_ClusteringBased_Algorithm_for_Automatic_Document_Separation >.

Forczmanski et al., "Segmentation of Scanned Documents Using Deep-Learning Approach", Progress in Computer Recognition Systems. Advances in Intelligent Systems and Computing, vol. 977, Jan. 2020, pp. 141-152, <https://www.researchgate.net/publication/332948719>.

Gallo et al., "Deep Neural Networks for Page Stream Segmentation and Classification," PRoceedings of the International Conference on Digital Image Computing: Techniques and Applications (DICTA), 2016, Gold Coast, QLD, pp. 1-7, <https://ieeexplore.ieee.org/document/7797031>.

Li et al. "DeepLayout: A Semantic Segmentation Approach to Page Layout Analysis", ICIC 2018, LNAI 10956, 2018, pp. 266-277, <https://www.researchgate.net/publication/326203124>.

Lin, Xiaofan, "Header and Footer Extraction by Page-Association" Proceedings of the Document Recognition and Retrieval X, Conference, Jan. 22-23, 2003, Santa Clara, California, 10 pages, <https://www.researchgate.net/publication/221253782>.

Wiedemann et al., "Page Stream Segmentation with Convolutional Neural Nets Combining Textual and Visual Features", Proceedings of the Language Resources and Evaluation (LREC) Conference, 2018, Miyazaki, Japan, 7 pages, <https://www.researchgate.netpublication/325618661_Page_Stream_Segmentation_with_Convolutional_Neural_Nets_Combining_Textual_and_Visual_Features>.

* cited by examiner

AUTOMATIC DOCUMENT SEPARATION

BACKGROUND

The present disclosure relates generally to the field of machine learning, and more particularly to using supervised and unsupervised learning for automatic document separation.

Machine learning is an artificial intelligence field that focuses on making machines learn. Machine learning is about finding ways to make machines do something better over time by learning. Supervised learning is a machine learning task of learning a function that maps an input to an output based on example input-output pairs. Supervised learning may infer a function from labeled training data consisting of a set of training examples. Unsupervised learning is a type of machine learning that looks for previously undetected patterns in a data set with no pre-existing labels and with a minimal amount of human supervision. Unsupervised learning may allow for modeling of probability densities over inputs. Optical character recognition may be an electronic or mechanical conversion of images of typed, handwritten or printed text into machine-encoded text, whether from a scanned document, a photo of a document, a scene-photo or from subtitle text superimposed on an image.

SUMMARY

Aspects of an embodiment of the present disclosure disclose an approach for an automatic document separation. A processor extracts one or more features from a document containing a plurality of pages. A processor generates a data frame based on the feature extraction. In response to analyzing a similarity between the plurality of pages, a processor determines whether the similarity exceeds a predetermined threshold. In response to determining that the similarity does not exceed the predetermined threshold, a processor transforms text into vectors forming float arrays. In response to benchmarking a set of predetermined clustering algorithms, a processor identifies a clustering algorithm using a predetermined criterion. A processor clusters the plurality of pages, using the clustering algorithm, to create a group of pages. A processor validates the clustered group of pages. In response to passing validation, a processor generates a set of final separated files based on the clustered group of pages.

DETAILED DESCRIPTION

The present disclosure is directed to systems and methods for using supervised and unsupervised learning for automatic document separation.

Embodiments of the present disclosure recognize a need for automatically separating a document containing different subdocuments. The document may be generated by scanning or merging digital documents. Embodiments of the present disclosure recognize a need of identifying each subdocument as its own entity. Embodiments of the present disclosure disclose separating document content (e.g. digital documents, scanned documents) into independent content groups or entities using semi-supervised learning techniques based on various features. Embodiments of the present disclosure disclose a flexible solution automatically performing separation of a document. Embodiments of the present disclosure disclose automatic document separation without configuration. Embodiments of the present disclosure disclose adopting various machine learning models to compare learning results and dynamically select a separation result. Embodiments of the present disclosure disclose making use of supervised (classification) and unsupervised (clustering) learning for document separation. Embodiments of the present disclosure disclose figuring out the first page of each respective potential sub-document without a training or configuration. First pages in documents may be detected based on the features and similarities of all the pages in the documents. The documents may be randomized.

Figure 1:
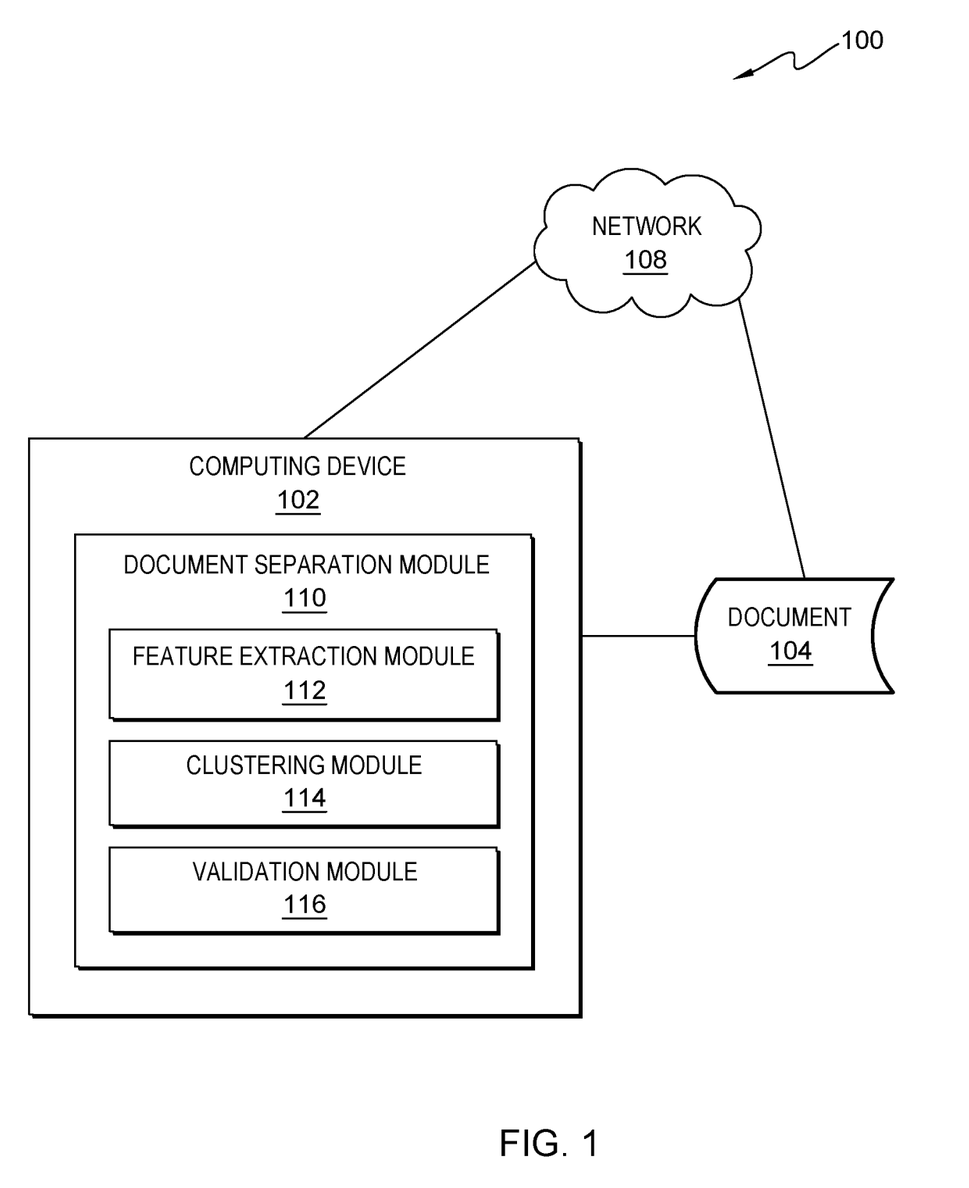
FIG. 1 is a functional block diagram illustrating an automatic document separation environment, in accordance with an embodiment of the present disclosure.

The present disclosure will now be described in detail with reference to the Figures. FIG. 1 is a functional block diagram illustrating an automatic document separation environment, generally designated 100, in accordance with an embodiment of the present disclosure.

In the depicted embodiment, automatic document separation environment 100 includes computing device 102, document 104, and network 108. Document 104 may be generated by scanning of physical documents and or merging of digital documents. Document 104 may include scanned documents. For example, scanned documents can be in pdf format, jpg format, or any other suitable scanned document format. Document 104 may include digitized documents. For example, digitized documents can be in a word processing file format, spreadsheet file format, or any other suitable digitized document format. Document 104 may include different subdocuments. Document 104 may contain information of different entities on each page. In the depicted embodiment, document 104 is located externally outside computing device 102. Document 104 may be accessed directly by computing device 102 or through a communication network such as network 108. However, in other embodiments, document 104 may be located on computing device 102.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to document separation module 110 and network 108 and is capable of processing program instructions and executing document separation module 110, in accordance with an embodiment of the present disclosure. Computing device 102 may include internal and external hardware components, as depicted and described in further detail with respect to FIG. 6.

Further, in the depicted embodiment, computing device 102 includes document separation module 110. In the depicted embodiment, document separation module 110 is located on computing device 102. However, in other embodiments, document separation module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and document separation module 110, in accordance with a desired embodiment of the disclosure.

In one or more embodiments, document separation module 110 is configured to extract features from document 104 containing a plurality of pages. The extracted features may be used as separator determinants. Document separation module 110 may detect blank pages to avoid for optical character recognition (OCR) processing. For example, document separation module 110 may read document 104 and convert document 104 to grey scale. Document separation module 110 may extract the largest contour in document 104. If the largest contour is a square, document separation module 110 may remove and extract the contour from document 104. Document separation module 110 may extract block and table content by using OCR on non-blank pages. For example, document separation module 110 may use OCR to construct blocks, tables and layout information for each page for content text, e.g., from a word processing file, spreadsheet file, presentation, or other document format file. Document separation module 110 may detect details of words and characters in document 104. The detected information can be useful as the information can provide additional features to optimize the clustering process. Document separation module 110 may classify each page according to a respective document class. Document separation module 110 may extract header and footer information on combined pages. Document separation module 110 may extract coordinates and text of predefined header and footer of each page. To be more specific, coordinates of each block may be extracted and if the block is not identified as a relevant block, the coordinates may be ignored. In response to detecting the header and footer information, document separation module 110 may detect page end for each respective page, wherein header and footer coordinates may be ignored. For example, document separation module 110 may run on each page to determine the coordinates of the last line. Document separation module 110 may cluster coordinates into two group to determine which coordinates are lower than the others. Document separation module 110 may determine a cluster with the lowest coordinate as the page end candidate. In the case, where there is only one cluster, the last page may be set as the page end candidate.

In one or more embodiments, document separation module 110 is configured to generate a data frame based on the feature extraction from document 104. The data frame may include document content, a document class for each page, a blank page, a sentence end, and headers and footers using extracted information.

In one or more embodiments, document separation module 110 is configured to analyze a similarity between pages in document 104. Document separation module 110 may analyze the similarity between pages to determine if the pages are closely related and to determine possible number of groups needed. Document separation module 110 may determine whether the similarity exceeds a predetermined threshold. In response to determining the similarity exceeds the predetermined threshold, document separation module 110 may identify the pages belonging to one group. Document separation module 110 may output the pages belonging to one group to a single file and may indicate to a user accordingly. In response to determining the similarity does not exceed the predetermined threshold, document separation module 110 may transform text into vectors forming float arrays for the algorithms to process the text. Document separation module 110 may benchmark a set of predetermined clustering algorithms. Document separation module 110 may ingest the text through the set of benchmark clustering algorithms.

In one or more embodiments, document separation module 110 is configured to identify a clustering algorithm using a predetermined criterion. Document separation module 110 may create a benchmark of all clustering algorithms. Document separation module 110 may determine which one is the best for a given data set. For example, document separation module 110 may identify the best clustering algorithm based on a validation score.

In one or more embodiments, document separation module 110 is configured to cluster the plurality of pages using the clustering algorithm to create a group of pages. In one or more embodiments, document separation module 110 is configured to validate the clustered group of pages. For example, document separation module 110 may generate a classifier benchmark using the group of pages. Document separation module 110 may identify a classifier using a predetermined criterion. Document separation module 110 may use the identified classifier to validate the clustered group.

In one or more embodiments, document separation module 110 is configured to generate a set of final separated files based on the clustered group of pages from document 104. Document separation module 110 may create a classification model for validation of the clustered group of pages. Document separation module 110 may benchmark multiple classification algorithms. Document separation module 110 may select the best classification algorithm for the dataset. Document separation module 110 may determine an accuracy score from validating training. Document separation module 110 may determine based on the already clustered groups if the clustering is correct or further work is needed. If document separation module 110 determines validation result is positive, document separation module 110 may return the result to a user and may generate a set of final separated files. However, if document separation module 110 determines the validation result is negative, document separation module 110 may perform a reiterative validation process by using individual features as a cluster determinant for correlating results as one. For example, in response to a passing validation, document separation module 110 may generate a set of final separated files based on the clustered group of pages from document 104. In response to a failing validation, document separation module 110 may combine pre-trained classification results and clustering results. Document separation module 110 may validate the combined results of pre-trained classification results and clustering results. In response to passing validation after the validation of the combined result, document separation module 110 may generate a set of final separated files.

Further, in the depicted embodiment, document separation module 110 includes feature extraction module 112, clustering module 114 and validation module 116. In the depicted embodiment, feature extraction module 112, clustering module 114 and validation module 116 are located on computing device 102. However, in other embodiments, feature extraction module 112, clustering module 114 and validation module 116 may be located externally and accessed through a communication network such as network 108.

In one or more embodiments, feature extraction module 112 is configured to extract features from document 104 containing a plurality of pages. The extracted features may be used as separator determinants for document 104. Feature extraction module 112 may detect blank pages to avoid for OCR processing. For example, feature extraction module 112 may read document 104 and convert document 104 to grey scale. Feature extraction module 112 may extract the largest contour in document 104. If the largest contour is a square, feature extraction module 112 may remove and extract the contour from document 104. Feature extraction module 112 may extract block and table content by using OCR on non-blank pages. For example, feature extraction module 112 may use OCR to construct blocks, tables and layout information for each page for content texts, e.g., from a word processing file, spreadsheet file, presentation, or other document format. Feature extraction module 112 may detect details of words and characters in document 104. The detected information can be useful as the information can provide additional features to optimize the clustering process. Feature extraction module 112 may classify each page according to a respective document class. Feature extraction module 112 may extract header and footer information on the combined pages. Feature extraction module 112 may extract coordinates and text of predefined header and footer of each page. For example, feature extraction module 112 may extract coordinates of each block. If the block is not identified as a relevant block, the coordinates may be ignored. In response to detecting the header and footer information, feature extraction module 112 may detect page end for each respective page, wherein header and footer coordinates may be ignored. For example, feature extraction module 112 may run on each page to determine the coordinates of the last line. Feature extraction module 112 may cluster coordinates into two group to determine which coordinates are lower than the others. Feature extraction module 112 may determine a cluster with the lowest y-axle coordinate as the page end candidate. In the case, where there is only one cluster, the last page may be set as the page end candidate. Feature extraction module 112 may generate a data frame based on the feature extraction from document 104. The data frame may include document content, a document class for each page, a blank page, a sentence end, and headers and footers using extracted information.

In one or more embodiments, clustering module 114 is configured to analyze a similarity between pages in document 104. Clustering module 114 may analyze the similarity between the pages to determine if the pages are closely related and to determine possible number of groups needed. Clustering module 114 may determine whether the similarity exceeds a predetermined threshold. In response to determining the similarity exceeds the predetermined threshold, clustering module 114 may identify the pages belonging to one group. Clustering module 114 may output the pages belonging to one group to a single file and may indicate to a user accordingly. In response to determining the similarity does not exceed the predetermined threshold, clustering module 114 may transform text into vectors forming float arrays for the algorithms to recognize the text. Clustering module 114 may benchmark a set of predetermined clustering algorithms. Clustering module 114 may ingest the text through the set of benchmarked clustering algorithms.

In one or more embodiments, clustering module 114 is configured to identify a clustering algorithm using a predetermined criterion. Clustering module 114 may create a benchmark of all clustering algorithms. Clustering module 114 may determine which one is the best for a given data set. For example, clustering module 114 may identify the best clustering algorithm based on a validation score. Clustering module 114 may cluster the plurality of pages using the clustering algorithm to create a group of pages.

In one or more embodiments, validation module 116 is configured to validate the clustered group of pages. For example, validation module 116 may generate a classifier benchmark using the group of pages. Validation module 116 may identify a classifier using a predetermined criterion. Validation module 116 may use the identified classifier to validate the clustered group. Validation module 116 may generate a set of final separated files based on the clustered group of pages from document 104. Validation module 116 may create a classification model for validation of the clustered group of pages. Validation module 116 may benchmark multiple classification algorithms. Validation module 116 may select the best classification algorithm that would work for the dataset. Validation module 116 may determine an accuracy score from validating training. Validation module 116 may determine based on the already clustered groups if the clustering is correct or further work is needed. If validation module 116 determines validation result is positive, validation module 116 may return the result to a user and may generate a set of final separated files. However, if validation module 116 determines the validation result is negative, validation module 116 may perform a reiterative validation process by using individual features as a cluster determinant before correlating results as one. For example, in response to passing validation, validation module 116 may generate a set of final separated files based on the clustered group of pages from document 104. In response to failing validation, validation module 116 may combine pre-trained classification results and clustering results. Validation module 116 may validate the combination of pre-trained classification results and clustering results. In response to passing validation after the validation of the combined result, validation module 116 may generate a set of final separated files.

Figure 2:
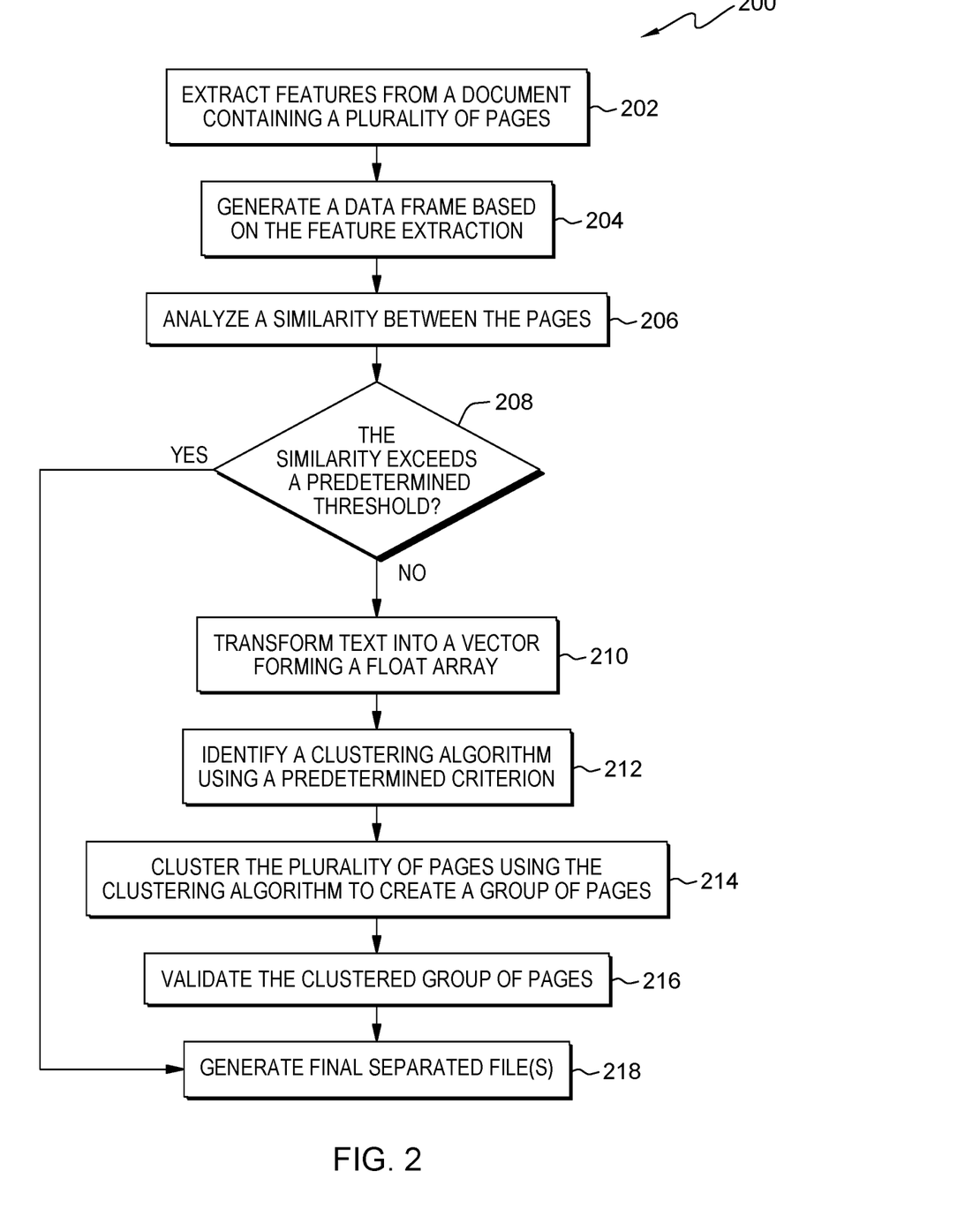
FIG. 2 is a flowchart depicting operational steps of a document separation module within a computing device of FIG. 1, in accordance with an embodiment of the present disclosure.

FIG. 2 is a flowchart 200 depicting operational steps of document separation module 110 in accordance with an embodiment of the present disclosure.

Document separation module 110 operates to extract a set of features from document 104 containing a plurality of pages. Document separation module 110 also operates to generate a data frame based on the feature extraction from document 104. Document separation module 110 operates to analyze a similarity between pages in document 104. Document separation module 110 operates to determine whether the similarity between the pages exceeds a predetermined threshold. Document separation module 110 operates to transform text into vectors forming float arrays. Document separation module 110 operates to identify a clustering algorithm using a predetermined criterion. Document separation module 110 operates to cluster the plurality of pages using the clustering algorithm to create a group of pages. Document separation module 110 operates to validate the clustered group of pages. Document separation module 110 operates to generate a set of final separated files based on the clustered group of pages from document 104.

In step 202, document separation module 110 extracts a set of features from document 104 containing a plurality of pages. The extracted features may be used as separator determinants for document 104. Document separation module 110 may detect blank pages to avoid OCR processing of such detected blank pages. For example, document separation module 110 may read document 104 and convert document 104 to grey scale. Document separation module 110 may extract the largest contour in document 104. If the largest contour in document 104 is a square, document separation module 110 may remove and extract the contour from document 104. Document separation module 110 may extract block and table content by using OCR on non-blank pages. For example, document separation module 110 may use OCR to construct blocks, tables and layout information for each page for content text, e.g., from a word processing, spreadsheet, presentation, or other document format. Document separation module 110 may detect details of words and characters in document 104. The detected information can be useful as the information can provide additional features to optimize the clustering process. Document separation module 110 may classify each page according to a respective document class. Document separation module 110 may extract header and footer information on combined pages. Document separation module 110 may extract coordinates and text of predefined header and footer of each page. To be more specific, document separation module 110 may extract coordinates of each block and if the block is not identified as a relevant block, document separation module 110 may ignore the coordinates. In response to detecting the header and footer information, document separation module 110 may detect a page end for each respective page, wherein header and footer coordinates may be ignored. For example, document separation module 110 may run on each page to determine the coordinates of the last line. Document separation module 110 may cluster coordinates into two group to determine which coordinates are lower than the others. Document separation module 110 may determine a cluster with the lowest y coordinate as the page end candidate. In the case where there is only one cluster, the last page may be set as the page end candidate.

In step 204, document separation module 110 generates a data frame based on the feature extraction from document 104. The data frame may include document content, a document class for each page, a blank page, a sentence end, and headers and footers using extracted information.

In step 206, document separation module 110 analyzes a similarity between pages in document 104. Document separation module 110 may analyze the similarity between pages to determine if the pages are closely related and to determine possible number of groups needed. For example, document separation module 110 may analyze the similarity based on words, font, font size, language, color, word count, reading level, and subject matter on the pages to determine possible number of groups needed.

In decision 208, document separation module 110 determines whether the similarity between the pages exceeds a predetermined threshold. For example, the predetermined threshold can be a predefined similarity based on words, font, font size, language, color, word count, reading level, and subject matter on the pages. If the similarity exceeds the predetermined threshold (decision 208, "YES" branch), document separation module 110 may identify the pages belonging to one group. Document separation module 110 may output the pages belonging to one group to a single file and may indicate to a user accordingly. Document separation module 110 may indicate document 104 as a single file and generate a final file in step 218. If the similarity does not exceed the predetermined threshold (decision 208, "NO" branch), document separation module 110 may transform text into vectors forming float arrays for algorithms to understand the text in step 210. Document separation module 110 may benchmark a set of predetermined clustering algorithms. Document separation module 110 may ingest the text through the set of benchmarked clustering algorithms.

In step 212, document separation module 110 identifies a clustering algorithm using a predetermined criterion. For example, the predetermined criterion can be based on a connectivity-based clustering, centroid-based clustering (e.g., k-means clustering optimizing object distances), and distribution-based clustering. Document separation module 110 may create a benchmark of all clustering algorithms. Document separation module 110 may determine which one is the best for a given data set. For example, document separation module 110 may identify the best clustering algorithm based on a validation score. For example, a validation score can be summary of a single quality score of the clustered objects.

In step 214, document separation module 110 clusters the plurality of pages using the clustering algorithm to create a group of pages. In step 216, document separation module 110 validates the clustered group of pages. For example, document separation module 110 may generate a classifier benchmark using the group of pages. Document separation module 110 may use the classifier benchmark identified classifier to validate the clustered group. Document separation module 110 may create a classification model for validation of the clustered group of pages. Document separation module 110 may benchmark multiple classification algorithms. Document separation module 110 may select the best classification algorithm that would work for the dataset. Document separation module 110 may determine an accuracy score from validating training.

In step 218, document separation module 110 generates a set of final separated files based on the clustered group of pages from document 104. Document separation module 110 may create a classification model for validation of the clustered group of pages. Document separation module 110 may benchmark multiple classification algorithms. Document separation module 110 may select the best classification algorithm that would work for the dataset. Document separation module 110 may determine an accuracy score from validating training. Document separation module 110 may determine based on the already clustered groups if the clustering is correct or further work is needed. If document separation module 110 determines a validation result is positive, document separation module 110 may return the result to a user and may generate a set of final separated files. However, if document separation module 110 determines the validation result is negative, document separation module 110 may perform a reiterative validation process by using individual features as cluster determinant before correlating results as one. For example, in response to passing validation, document separation module 110 may generate a set of final separated files based on the clustered group of pages from document 104. In response to failing validation, document separation module 110 may combine pre-trained classification results and clustering results. Document separation module 110 may validate the combination of pre-trained classification results and clustering results. In response to passing validation after the validation of the combined result, document separation module 110 may generate a set of final separated files.

Figure 3:
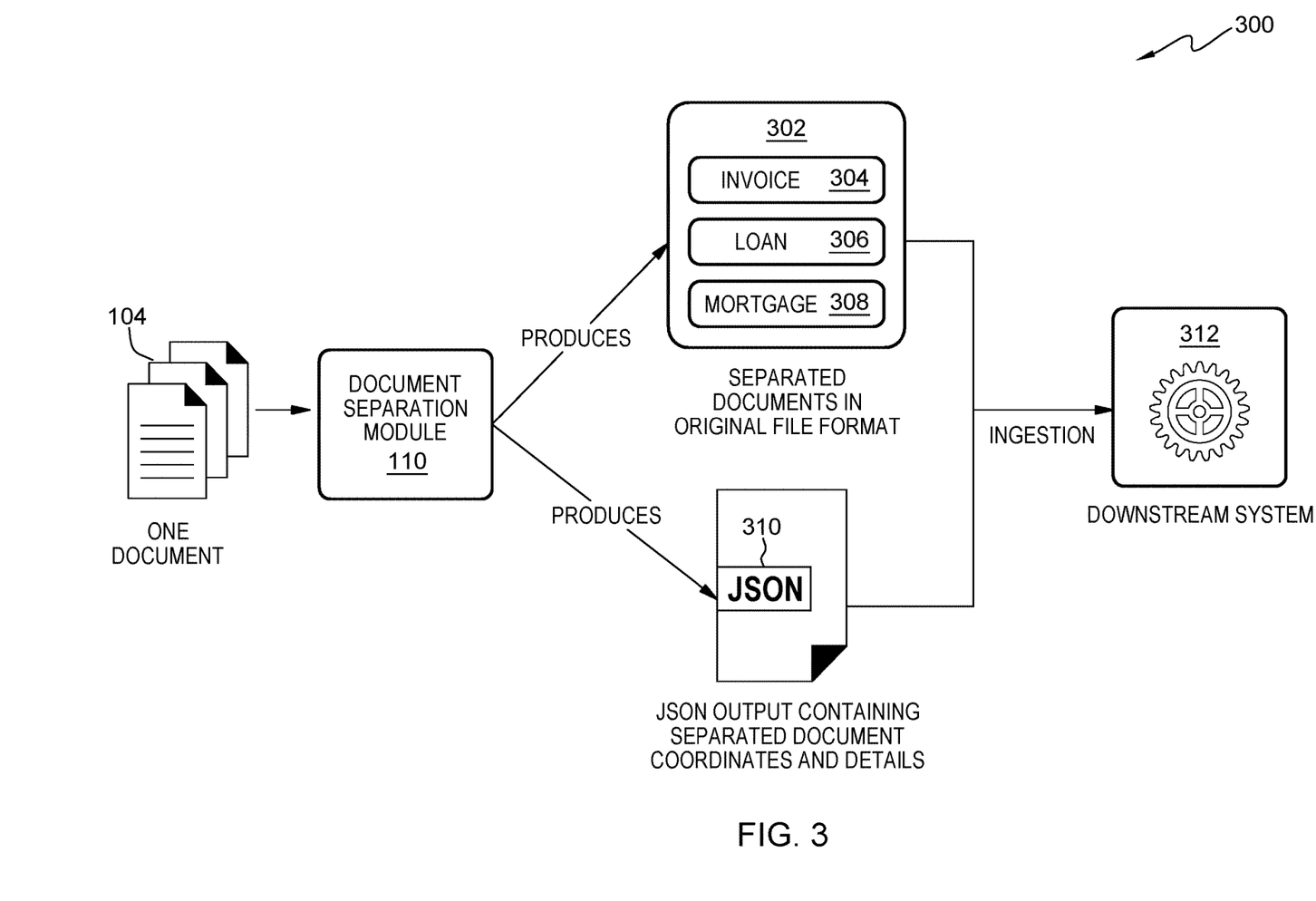
FIG. 3 is an example process 300 using the document separation module in the automatic document separation environment of FIG. 1, in accordance with an embodiment of the present disclosure.

FIG. 3 is an example process 300 using document separation module 110 in automatic document separation environment 100 in accordance with one or more embodiments of the present disclosure.

In the example process 300, document separation module 110 receives and processes document 104. Document separation module 110 may produce separated documents in an original file format of document 104. For example, the original file format can be in pdf format, jpg format, word processing file format, spreadsheet file format, or any other suitable document format. The separated documents can be different subdocuments. In the example, the subdocuments are illustrated containing information of different entities, such as invoice 304, loan 306, mortgage 308. However, in other embodiments, the subdocuments can be any type of documents. In another example, document separation module 110 may produce a file in a JavaScript Object Notation (JSON) format that may contain separated coordinates and details of document 104. However, in other embodiments, the file can be in any other suitable file format, for example, a hypertext markup language (HTML) file, a comma-separated values (CSV) file etc. Document separation module 110 may output the separated documents 302, 310 to downstream system 312.

Figure 4:
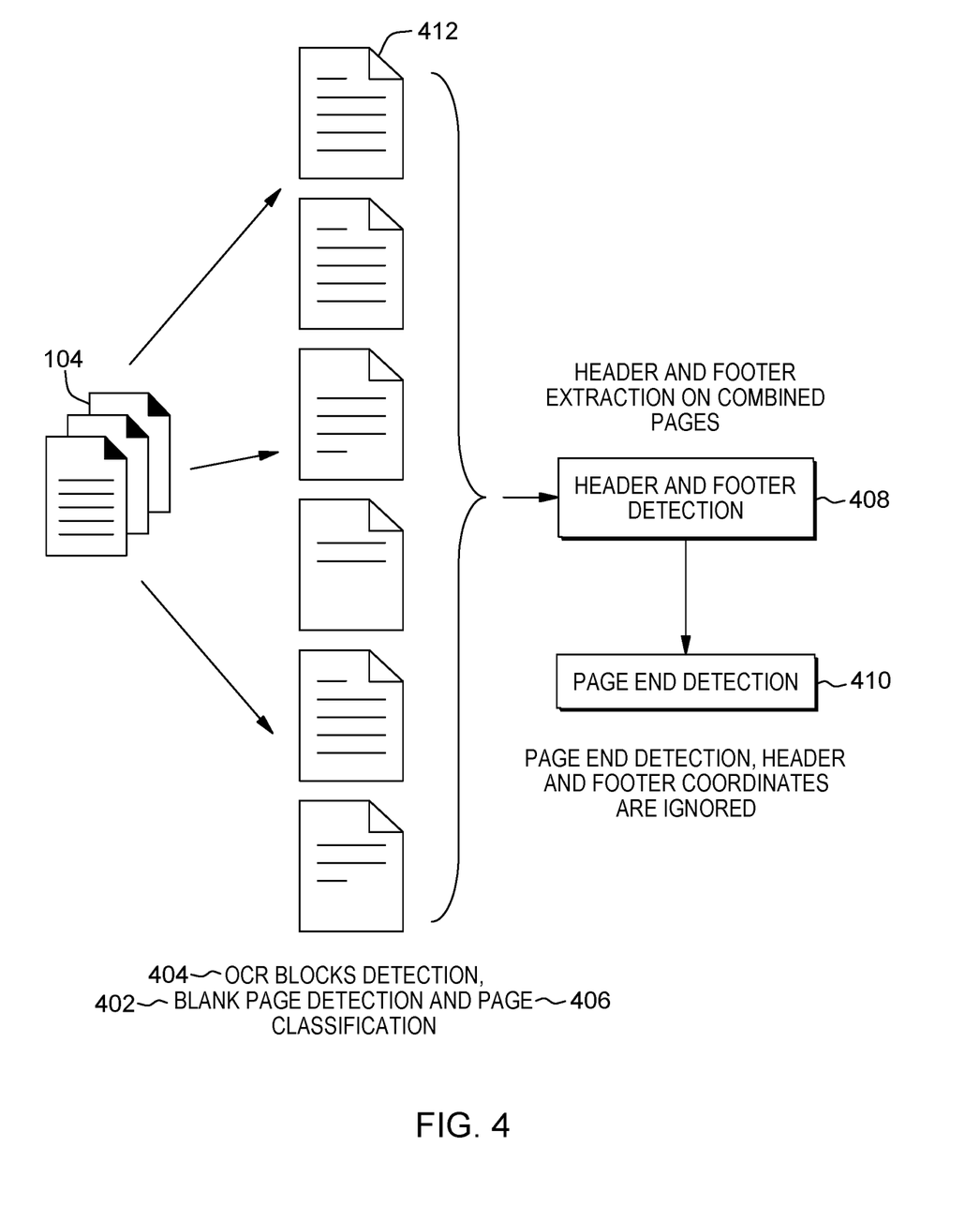
FIG. 4 illustrates an exemplary functional diagram of a feature extraction module in the document separation module within the computing device of FIG. 1, in accordance with an embodiment of the present disclosure.

FIG. 4 illustrates an exemplary functional diagram of feature extraction module 112 in document separation module 110 in accordance with one or more embodiments of the present disclosure.

In the example of FIG. 4, feature extraction module 112 includes blank page detection 402, OCR blocks detection 404, page classification 406, header and footer detection 408, and page end detection 410. Feature extraction module 112 may extract features from document 104 containing a plurality of pages 412. The extracted features may be used as separator determinants. Feature extraction module 112 may detect blank pages to avoid for OCR processing. For example, feature extraction module 112 may read document 104 and convert to grey scale. Feature extraction module 112 may extract the largest contour in document 104. If the largest contour is a square, feature extraction module 112 may remove and extract the contour from document 104. Feature extraction module 112 may extract block and table content by using OCR on non-blank pages. For example, feature extraction module 112 may use OCR to construct blocks, tables and layout information for each page for content texts, e.g., from a word processing file, a spreadsheet file, presentation, or other document format. Feature extraction module 112 may detect details of words and characters in document 104. The detected information can be useful as the information can provide additional features to optimize the clustering process. Feature extraction module 112 may classify each page according to a respective document class. Feature extraction module 112 may extract header and footer information on combined pages. Feature extraction module 112 may extract coordinates and text of predefined header and footer of each page. To be more specific, coordinates of each block may be extracted. If the block is not identified as a relevant block, the coordinates may be ignored. In response to detecting the header and footer information, feature extraction module 112 may detect page end for each respective page, wherein header and footer coordinates may be ignored. For example, feature extraction module 112 may run on each page to determine the coordinates of the last line. Feature extraction module 112 may cluster coordinates into two group to determine which coordinates are lower than the others. Feature extraction module 112 may determine a cluster with the lowest y-axle coordinate as the page end candidate. In the case, where there is only one cluster, the last page may be set as the page end candidate.

Figure 5:
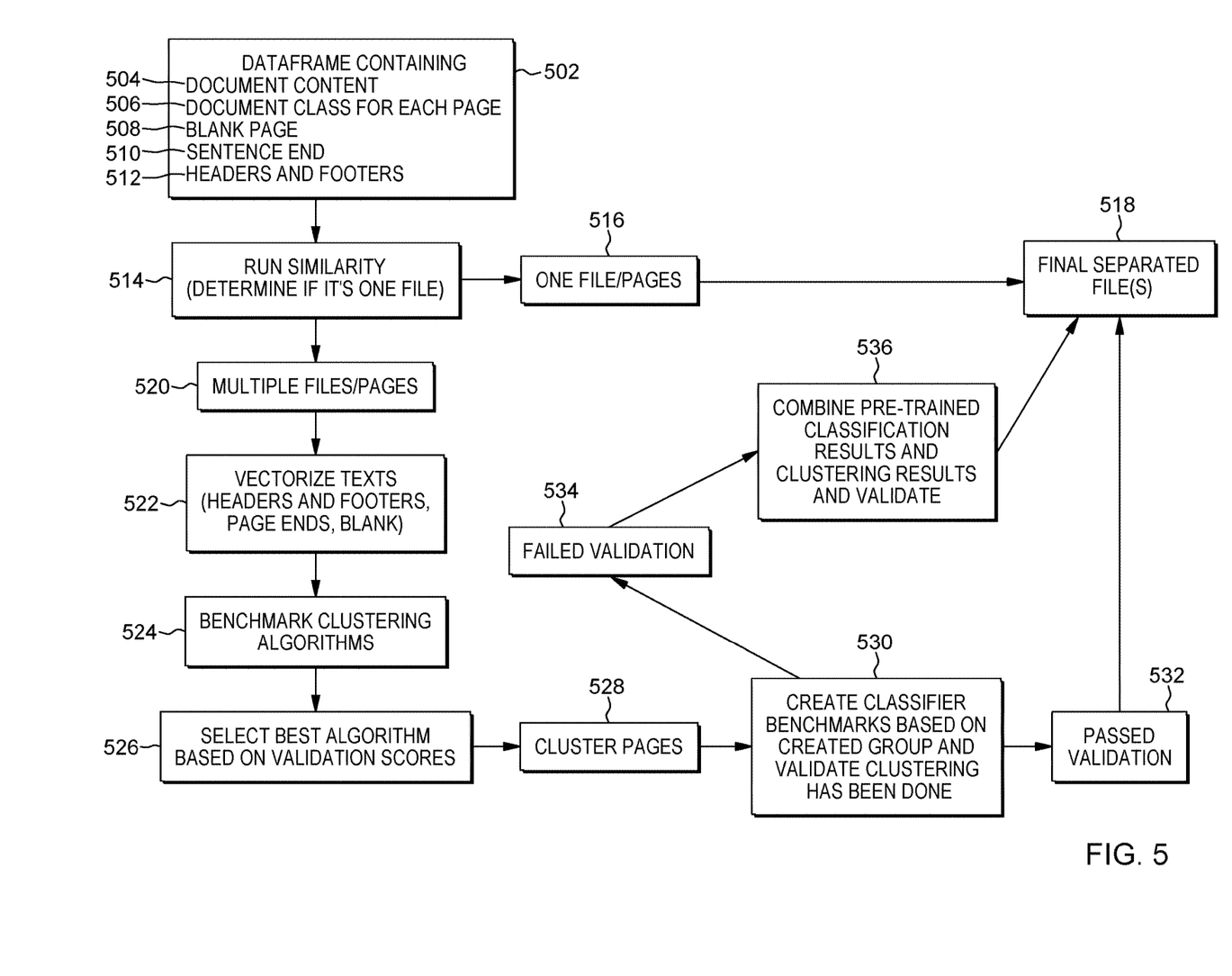
FIG. 5 illustrates an exemplary functional diagram of the document separation module within the computing device of FIG. 1, in accordance with an embodiment of the present disclosure.

FIG. 5 illustrates an exemplary functional diagram of document separation module 110 in accordance with one or more embodiments of the present disclosure.

In the example of FIG. 5, document separation module 110 generates data frame 502 based on the feature extraction from document 104. Data frame 502 includes document content 504, document class 506 for each page, blank page 508, sentence end 510, and headers and footers 512. In block 514, document separation module 110 runs a similarity analysis between pages in document 104. Document separation module 110 may analyze the similarity between pages to determine if the pages are closely related and to determine possible number of groups needed. Document separation module 110 determines whether the similarity between the pages exceeds a predetermined threshold. If the similarity exceeds the predetermined threshold, document separation module 110 may identify the pages belonging to one group. Document separation module 110 may output the pages belonging to one group to one file 516 and may indicate to a user accordingly. Document separation module 110 may generate final file 518. If the similarity does not exceed the predetermined threshold, document separation module 110 determines document 104 as multiple files 520. In block 522, document separation module 110 may transform text into vectors forming float arrays for algorithms to understand the text. In block 524, document separation module 110 may benchmark of a set of predetermined clustering algorithms. Document separation module 110 may ingest the text through the set of benchmark clustering algorithms.

In block 526, document separation module 110 may identify and select a clustering algorithm using a predetermined criterion. Document separation module 110 may create a benchmark of all clustering algorithms. Document separation module 110 may determine which one is the best for a given data set. For example, document separation module 110 may identify the best clustering algorithm based on a validation score.

In block 528, document separation module 110 may cluster the plurality of pages using the clustering algorithm to create a group of pages. In block 530, document separation module 110 may validate the clustered group of pages. For example, document separation module 110 may generate a classifier benchmark using the group of pages. Document separation module 110 may identify a classifier using a predetermined criterion. Document separation module 110 may use the identified classifier to validate the clustered group. Document separation module 110 may create a classification model for validation of the clustered group of pages. Document separation module 110 may benchmark multiple classification algorithms. Document separation module 110 may select the best classification algorithm that would work for the dataset. Document separation module 110 may determine an accuracy score from validating training. Document separation module 110 may determine based on the already clustered groups if the clustering is correct or further work is needed. If document separation module 110 determines a validation result is positive (passed validation 532), document separation module 110 may return the result to a user and may generate a set of final separated files 518. However, if document separation module 110 determines the validation result is negative (failed validation 534), document separation module 110 may perform a reiterative validation process by using individual features as cluster determinant before correlating results as one. For example, in response to passing validation 532, document separation module 110 may generate a set of final separated files 518 based on the clustered group of pages from document 104. In response to failing validation 534, document separation module 110 may combine pre-trained classification results and clustering results in block 536. Document separation module 110 may validate the combination of pre-trained classification results and clustering results. In response to passing validation after the validation of the combined result, document separation module 110 may generate a set of final separated files 518.

Figure 6:
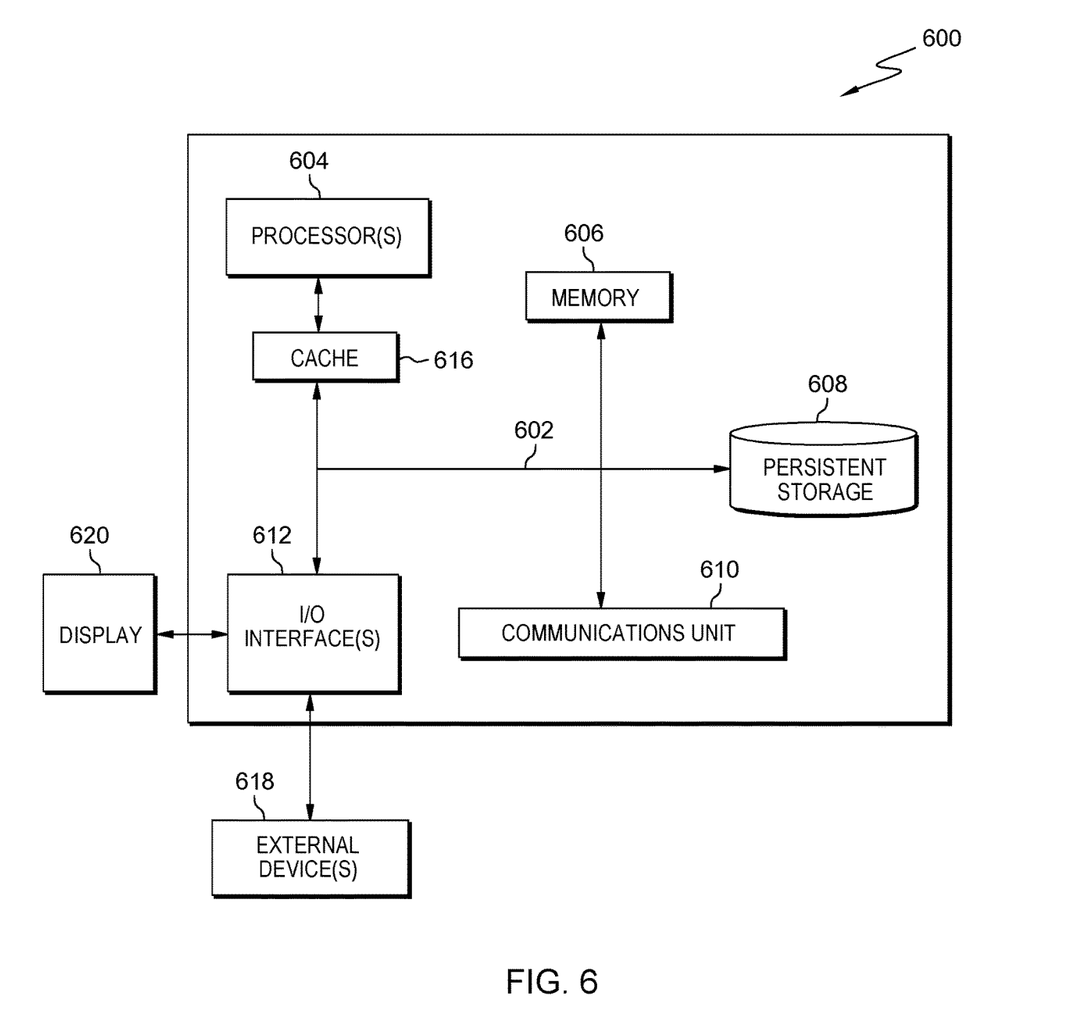
FIG. 6 is a block diagram of components of the computing device of FIG. 1, in accordance with an embodiment of the present disclosure.

FIG. 6 depicts a block diagram 600 of components of computing device 102 in accordance with an illustrative embodiment of the present disclosure. It should be appreciated that FIG. 6 provides only an illustration of one implementation and does not imply any limitations with regard to the environments in which different embodiments may be implemented. Many modifications to the depicted environment may be made.

Computing device 102 may include communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Document separation module 110 may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Document separation module 110 may be downloaded to persistent storage 608 through communications unit 610.

I/O interface(s) 612 allows for input and output of data with other devices that may be connected to computing device 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., document separation module 110 can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   extracting, by one or more processors, one or more features from a document containing a plurality of pages;
   generating, by one or more processors, a data frame based on the feature extraction;
   in response to analyzing a similarity between the plurality of pages, determining, by one or more processors, whether the similarity exceeds a predetermined threshold;
   in response to determining that the similarity does not exceed the predetermined threshold, transforming, by one or more processors, text into vectors forming float arrays;
   in response to benchmarking a set of predetermined clustering algorithms, identifying, by one or more processors, a clustering algorithm using a predetermined criterion;
   clustering, by one or more processors, the plurality of pages, using the clustering algorithm, to create a group of pages;

validating, by one or more processors, the clustered group of pages; and in response to passing validation, generating, by one or more processors, a set of final separated files based on the clustered group of pages.

2. The computer-implemented method of claim 1, wherein extracting the one or more features from the document comprises:

detecting one or more blank pages to avoid for optical character recognition processing, extracting, using optical character recognition on one or more non-blank pages, block and table content, classifying the non-blank pages according to a respective document class, extracting header and footer information on combined pages, and in response to detecting the header and footer information, detecting a page end for each respective page, wherein header and footer coordinates are ignored.

3. The computer-implemented method of claim 2, wherein the data frame comprises document content, a document class for each page, a blank page, a sentence end, and headers and footers using extracted information.

4. The computer-implemented method of claim 1, wherein validating the clustered group of pages comprises:

generating a classifier benchmark using the group, identifying a classifier using a predetermined criterion, and using the identified classifier to validate the clustered group.

5. The computer-implemented method of claim 4, further comprising:

in response to failing validation, combining pre-trained classification results and clustering results;

validating the combination of pre-trained classification results and clustering results; and in response to passing validation, generating the set of final separated files.

6. The computer-implemented method of claim 1, further comprising using the extracted features as separator determinants for the document.

7. The computer-implemented method of claim 1, wherein the predetermined criterion of identifying the clustering algorithm is based on a validation score.

8. A computer program product comprising:

one or more computer readable storage media, and program instructions collectively stored on the one or more computer readable storage media, the program instructions comprising:

program instructions to extract one or more features from a document containing a plurality of pages;

program instructions to generate a data frame based on the feature extraction;

program instructions to, in response to analyzing a similarity between the plurality of pages, determine whether the similarity exceeds a predetermined threshold;

program instructions to, in response to determine that the similarity does not exceed the predetermined threshold, transform text into vectors forming float arrays;

program instructions to, in response to benchmarking a set of predetermined clustering algorithms, identify a clustering algorithm using a predetermined criterion;

program instructions to cluster the plurality of pages, using the clustering algorithm, to create a group of pages;

program instructions to validate the clustered group of pages; and program instructions to, in response to passing validation, to generate a set of final separated files based on the clustered group of pages.

9. The computer program product of claim 8, wherein program instructions to extract the one or more features from the document comprise:

program instructions to detect one or more blank pages to avoid for optical character recognition processing, program instructions to extract, using optical character recognition on one or more non-blank pages, block and table content, program instructions to classify the non-blank pages according to a respective document class, program instructions to extract header and footer information on combined pages, and program instructions to, in response to detecting the header and footer information, detect a page end for each respective page, wherein header and footer coordinates are ignored.

10. The computer program product of claim 9, wherein the data frame comprises document content, a document class for each page, a blank page, a sentence end, and headers and footers using extracted information.

11. The computer program product of claim 8, wherein program instructions to validate the clustered group of pages comprises:

program instructions to generate a classifier benchmark using the group, program instructions to identify a classifier using a predetermined criterion, and program instructions to use the identified classifier to validate the clustered group.

12. The computer program product of claim 11, further comprising:

program instructions, stored on the one or more computer-readable storage media, to, in response to failing validation, combine pre-trained classification results and clustering results;

program instructions, stored on the one or more computer-readable storage media, to validate the combination of pre-trained classification results and clustering results; and program instructions, stored on the one or more computer-readable storage media, to, in response to passing validation, generate the set of final separated files.

13. The computer program product of claim 8, further comprising:

program instructions, stored on the one or more computer-readable storage media, to use the extracted features as separator determinants for the document.

14. The computer program product of claim 8, wherein the predetermined criterion of identifying the clustering algorithm is based on a validation score.

15. A computer system comprising:

one or more computer processors, one or more computer readable storage media, and program instructions stored on the one or more computer readable storage media for execution by at least one of the one or more computer processors, the program instructions comprising:

program instructions to extract one or more features from a document containing a plurality of pages;

program instructions to generate a data frame based on the feature extraction;

program instructions to, in response to analyzing a similarity between the plurality of pages, determine whether the similarity exceeds a predetermined threshold;

program instructions to, in response to determine that the similarity does not exceed the predetermined threshold, transform text into vectors forming float arrays;

program instructions to, in response to benchmarking a set of predetermined clustering algorithms, identify a clustering algorithm using a predetermined criterion;

program instructions to cluster the plurality of pages, using the clustering algorithm, to create a group of pages;

program instructions to validate the clustered group of pages; and program instructions to, in response to passing validation, to generate a set of final separated files based on the clustered group of pages.

16. The computer system of claim 15, wherein program instructions to extract the one or more features from the document comprise:

program instructions to detect one or more blank pages to avoid for optical character recognition processing, program instructions to extract, using optical character recognition on one or more non-blank pages, block and table content, program instructions to classify the non-blank pages according to a respective document class, program instructions to extract header and footer information on combined pages, and program instructions to, in response to detecting the header and footer information, detect a page end for each respective page, wherein header and footer coordinates are ignored.

17. The computer system of claim 16, wherein the data frame comprises document content, a document class for each page, a blank page, a sentence end, and headers and footers using extracted information.

18. The computer system of claim 15, wherein program instructions to validate the clustered group of pages comprises:

program instructions to generate a classifier benchmark using the group, program instructions to identify a classifier using a predetermined criterion, and program instructions to use the identified classifier to validate the clustered group.

19. The computer system of claim 18, further comprising:

program instructions, stored on the one or more computer-readable storage media, to, in response to failing validation, combine pre-trained classification results and clustering results;

program instructions, stored on the one or more computer-readable storage media, to validate the combination of pre-trained classification results and clustering results; and program instructions, stored on the one or more computer-readable storage media, to, in response to passing validation, generate the set of final separated files.

20. The computer system of claim 15, further comprising:

program instructions, stored on the one or more computer-readable storage media, to use the extracted features as separator determinants for the document.

* * * * *